United States Patent
Krieter et al.

(10) Patent No.: US 12,182,879 B2
(45) Date of Patent: Dec. 31, 2024

(54) GENERATING INSURANCE QUOTES

(71) Applicant: Allstate Insurance Company, Northbrook, IL (US)

(72) Inventors: Dean Krieter, Rolling Meadows, IL (US); Salvador Lopez, Round Lake, IL (US); Anastasia Hannebrink, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/221,607

(22) Filed: Jul. 13, 2023

(65) Prior Publication Data

US 2023/0360142 A1 Nov. 9, 2023

Related U.S. Application Data

(63) Continuation of application No. 17/345,132, filed on Jun. 11, 2021, now Pat. No. 11,741,549, which is a
(Continued)

(51) Int. Cl.
G06Q 40/00 (2023.01)
G06Q 40/08 (2012.01)

(52) U.S. Cl.
CPC ................... *G06Q 40/08* (2013.01)

(58) Field of Classification Search
CPC ....................................... G06Q 40/08
(Continued)

(56) References Cited

U.S. PATENT DOCUMENTS 6,166,729 A 12/2000 Acosta et al.
6,868,386 B1 3/2005 Henderson et al.
(Continued)

FOREIGN PATENT DOCUMENTS

WO WO-2008098345 A1 8/2008

OTHER PUBLICATIONS

Internet banking: a customer-centric perspective; Proceedings of the 35th Annual Hawaii International Conference on System Sciences (pp. 2420-2429); D. Sciglimpaglia, D. Ely; Jan. 10, 2002. (Year: 2002).*
(Continued)

*Primary Examiner* — Tien C Nguyen
(74) *Attorney, Agent, or Firm* — Polsinelli PC

(57) ABSTRACT

Systems and methods provide for a computerized system for quoting home owners insurance and providing a more consultative way of delivering insurance quotes and insurance quote information. The system may present insurance consumers with an automated process of asking questions and receiving feedback. Based on the feedback, the system may provide insurance options and explanations of those options enabling consumers to make a decision that best fits their personal situation. For example, systems and methods are directed to determining and providing a deductible that fits a user based on the user's tolerance for risk and cash position. The system may also provide a description of the types of risks and damages that are covered by particular insurance coverages. The system may also provide an analysis of the insurance obtained by similarly situated individuals. The system may also provide descriptions of insurance features.

20 Claims, 13 Drawing Sheets

Related U.S. Application Data continuation of application No. 14/884,064, filed on Oct. 15, 2015, now Pat. No. 11,037,245.

(58) Field of Classification Search
USPC .......... 705/38, 39, 40, 37, 26, 4, 5; 239/370, 239/380; 235/492; 709/226, 227; 701/425; 704/9; 715/753; 706/25, 45
See application file for complete search history.

(56) References Cited

U.S. PATENT DOCUMENTS

| | | | |
|---|---|---|---|
| 7,406,427 B1 | 7/2008 | Guyan et al. | |
| 7,430,514 B1 | 9/2008 | Childress et al. | |
| 7,480,715 B1 | 1/2009 | Barker et al. | |
| 7,490,050 B2 | 2/2009 | Grover et al. | |
| 7,689,442 B2 | 3/2010 | Childress et al. | |
| 7,809,587 B2 | 10/2010 | Dorai et al. | |
| 7,889,931 B2 | 2/2011 | Webb et al. | |
| 7,953,615 B2 | 5/2011 | Aquila et al. | |
| 8,090,598 B2 | 1/2012 | Bauer et al. | |
| 8,239,220 B2 | 8/2012 | Kidd et al. | |
| 8,265,963 B1 | 9/2012 | Hanson et al. | |
| 8,346,578 B1 | 1/2013 | Hopkins, III et al. | |
| 8,374,957 B1 | 2/2013 | Garcia et al. | |
| 8,478,613 B2* | 7/2013 | Diefendorf | G06Q 40/08 705/4 |
| 8,527,305 B1 | 9/2013 | Hanson et al. | |
| 8,537,338 B1 | 9/2013 | Medasani et al. | |
| 8,543,486 B2 | 9/2013 | Donoho et al. | |
| 8,620,693 B1* | 12/2013 | Schumann, Jr. | G06Q 10/10 705/4 |
| 8,630,820 B2 | 1/2014 | Amis | |
| 8,666,784 B2 | 3/2014 | Stepeck et al. | |
| 8,725,541 B2* | 5/2014 | Andrist | G06Q 40/08 705/4 |
| 8,799,034 B1* | 8/2014 | Brandmaier | G07C 5/008 705/4 |
| 8,799,125 B2* | 8/2014 | Schumann, Jr. | G06Q 40/08 705/35 |
| 9,996,881 B2 | 6/2018 | Mdeway | |
| 2002/0007225 A1 | 1/2002 | Costello et al. | |
| 2002/0055861 A1 | 5/2002 | King et al. | |
| 2002/0111725 A1 | 8/2002 | Burge | |
| 2002/0116228 A1 | 8/2002 | Bauer et al. | |
| 2002/0188484 A1 | 12/2002 | Grover et al. | |
| 2003/0154111 A1 | 8/2003 | Dutra et al. | |
| 2003/0187700 A1 | 10/2003 | Bonissone et al. | |
| 2004/0044549 A1 | 3/2004 | Loop | |
| 2004/0088198 A1 | 5/2004 | Childress et al. | |
| 2004/0243423 A1 | 12/2004 | Rix et al. | |
| 2005/0080649 A1 | 4/2005 | Alvarez et al. | |
| 2007/0136109 A1 | 6/2007 | Yager et al. | |
| 2008/0091490 A1 | 4/2008 | Abrahams et al. | |
| 2008/0255887 A1 | 10/2008 | Gruter | |
| 2009/0002364 A1 | 1/2009 | Witte, II | |
| 2009/0027253 A1 | 1/2009 | van Tooren et al. | |
| 2009/0055226 A1 | 2/2009 | Tritz et al. | |
| 2009/0265193 A1 | 10/2009 | Collins et al. | |
| 2010/0250022 A1 | 9/2010 | Hines et al. | |
| 2010/0302359 A1 | 12/2010 | Adams et al. | |
| 2011/0022416 A1 | 1/2011 | Bergquist et al. | |
| 2011/0137443 A1 | 6/2011 | Farahani | |
| 2011/0161118 A1 | 6/2011 | Borden et al. | |
| 2011/0264472 A1 | 10/2011 | Mostelac | |
| 2012/0033821 A1 | 2/2012 | Ohta et al. | |
| 2012/0066004 A1 | 3/2012 | Lee | |
| 2012/0071998 A1 | 3/2012 | Davies et al. | |
| 2012/0140041 A1 | 6/2012 | Burgunder et al. | |
| 2012/0210853 A1 | 8/2012 | Abershitz et al. | |
| 2012/0250010 A1 | 10/2012 | Hannay | |
| 2012/0303336 A1 | 11/2012 | Becker et al. | |
| 2013/0013346 A1 | 1/2013 | O'Connor et al. | |
| 2013/0166325 A1 | 6/2013 | Ganapathy et al. | |
| 2013/0197947 A1* | 8/2013 | Carillo | G06Q 90/00 705/4 |
| 2013/0204645 A1 | 8/2013 | Lehman et al. | |
| 2013/0226624 A1* | 8/2013 | Blessman | H04N 7/181 705/4 |
| 2014/0163852 A1 | 6/2014 | Borri et al. | |
| 2014/0244078 A1 | 8/2014 | Downey et al. | |
| 2014/0257862 A1 | 9/2014 | Billman et al. | |
| 2014/0257871 A1* | 9/2014 | Christensen | H04W 4/40 705/4 |
| 2015/0006206 A1* | 1/2015 | Mdeway | G06Q 40/08 705/4 |
| 2016/0189303 A1* | 6/2016 | Fuchs | G06Q 40/08 705/4 |
| 2016/0189304 A1 | 6/2016 | Todasco et al. | |

OTHER PUBLICATIONS

FinancialCloud: Open Cloud Framework of Derivative Pricing; 2013 International Conference on Social Computing (pp. 782-789); Hsin-Tsung Peng, William W. Y. Hsu, Chih-Hung Chen, Feipei Lai, Jan-Ming Ho; Sep. 1, 2013. (Year: 2013).*

Bodendorf F., et al., "Enhancing e-CRM in the Insurance Industry by Mobile e-services," 2005 IEEE International Conference on e-Technology, e-Commerce and e-Service, Copyright 2005, Published on Jan. 1, 2005, 6 pages.

"Coverage Calculator," Liberty Mutual Insurance, Retrieved from URL: http://welcome.libertymutual.com/insurance-coverage-calculator-estimator/home.html, Accessed on Oct. 14, 2015, 4 pages.

"Determining the Insurance Deductible," Zillow, Retrieved from URL: https://www.Zillow.com, Accessed on May 6, 2015, 2 pages.

"Home Insurance," Confused.com, Retrieved from URL: https://www.confused.com/home-insurance, Accessed on May 6, 2015, 14 pages.

"Homeowner's Quote," State Farm, Retrieved from URL: https://www.statefarm.com, Accessed on May 6, 2015, 2 pages.

Internet banking: a customer-centric perspective; Proceedings of the 35th Annual Hawaii International Conference on System Sciences (pp. 2420-2429); D. Sciglimpaglia, D. Ely; Jan. 1, 2002. (Year: 2002).

The Scourge of Internet Personal Data Collection; 2013 International Conference on Availability, Reliability and Security (pp. 821-828); Esma Aimeur, Manuel Lafond; 2-Sep. 2013. (Year: 2013).

Zhong E., et al., "The Exploration for Using E-commerce Platform to Optimize Insurance Business," 2012 International Conference on Management of e-Commerce and e-Government, Copyright 2012, Published on Oct. 1, 2012, 7 pages.

* cited by examiner

GENERATING INSURANCE QUOTES

CROSS REFERENCE TO RELATED APPLICATIONS

This application is a continuation of and claims priority to U.S. application Ser. No. 17/345,132 filed Jun. 11, 2021, and entitled "Generating Insurance Quotes," which is a continuation of U.S. application Ser. No. 14/884,064, filed Oct. 15, 2015, and entitled "Generating Insurance Quotes." Each of these applications is incorporated by reference in its entirety herein.

TECHNICAL FIELD

The present disclosure relates to systems and methods for providing insurance quotes, and in particular home insurance quotes.

BACKGROUND

Conventional methods of delivering insurance quotes are focused on getting a price to a customer as quick as possible. In general, the process of generating and delivering insurance quotes can be driven by the desire of an insurance provider to get potential consumers to sign up as quickly as possible. Some insurance providers may set goals of providing an insurance quote within a certain amount of time beginning from a time at which a user begins entering information into, for example, an online (e.g., Internet) form. The consumer is often left with little understanding of the extent of the quoted insurance coverage. For example, when a consumer is provided with a quote for home insurance, the consumer is not provided with information that can help the consumer actually understand the type of coverage being offered and the reason for the coverage. Therefore, there may be a demand for a more consultative way of delivering insurance quotes and related supplemental information.

In view of the state of the insurance industry and insurance products, there may be demand for methods, systems, devices, software, etc. that provide a way of providing a consumer with more options to customize insurance coverage and information that aids consumers in understanding insurance quotes. There may also be a demand to provide more tailored quotes (e.g., quotes that focus on the characteristics of the consumer/policyholder as they are on the property to be insured).

SUMMARY

In light of the foregoing background, the following presents a simplified summary of the present disclosure in order to provide a basic understanding of some aspects of the invention. This summary is not an extensive overview of the disclosure. It is not intended to identify key or critical elements of the disclosure or to delineate the scope of the invention. The following summary merely presents some concepts of the disclosure in a simplified form as a prelude to the more detailed description provided below.

Certain aspects of the disclosure address one or more of the issues mentioned above by disclosing methods, computer readable storage media, software, systems, and apparatuses for providing a more consultative way of delivering insurance quotes and insurance quote information. In particular, the system may include a server or computing device for receiving, analyzing, and determining different information in regards to a particular consumer and providing insurance information and a quote based on the received information. The system may include computing devices associated with a consumer as well as network computing devices (e.g., computing devices in the "cloud" such as a server). The system may receive a request or information from a customer or potential customer regarding a house or home. The system may gather other information based on the location and demographics of the house or home. The system may receive customer information about the customer's financial risk tolerance or the customer's financial stability such as the customer's savings or liquid assets (or other readily available assets). The system may determine a quote based on the customer information. The system may determine common claims or costly claims to houses and homes similar to the house or home of the customer. The system may analyze the received information to calculate or determine deductible information for the customer. The system may determine a quote for the customer based on the information received.

Certain other aspects disclose a system comprising: a first computing device associated with a user (e.g., a mobile computing device associated with a home owner). The first computing device may be, for example, a smart phone, tablet, etc. The first computing device may be configured to communicate with other computing devices via a network. The system may also include more than one computing device, for example, a second or third computing device, which may be another computing device (e.g., a server) connected to the network (e.g., the Internet). The second computing device may be configured to receive information from the first computing device. The information may be a quote request or user information related to a quote, or risk tolerance data, or liquid asset data or any user information used for generating a quote and any user information needed for interpreting and understanding a quote. Certain other aspects disclose a method including: receiving, from a first device at a server, a request for a quote for home insurance by a user; receiving, from the first device at the server, user information, wherein the user information may include risk tolerance data for the user, liquid asset data for the user, or zip code data for a home for which the home insurance may cover; determining, at the server, based on the zip code data, common claims or costly claims; analyzing the risk tolerance data or the liquid asset data in order to determine a deductible; determining a premium; generating the quote based on the deductible or the premium; or outputting, from the server, the quote along with at least one of common claim information indicating at least one of the common claims, costly claim information indicating at least one of the costly claims, or deductible information which may provide an explanation for the deductible.

The details of these and other embodiments of the disclosure are set forth in the accompanying drawings and description below. Other features and advantages of aspects of the disclosure will be apparent from the description, drawings, and claims.

BRIEF DESCRIPTION OF THE DRAWINGS

All descriptions are exemplary and explanatory only and are not intended to restrict the disclosure. The accompanying drawings, which are incorporated in and constitute a part of this specification, illustrate embodiments of the disclosure and, together with the description, serve to explain principles of the disclosure. In the drawings:

FIG. 7 shows an illustrative interface in accordance with various aspects of the present disclosure.

FIG. 8C shows an illustrative interface in accordance with various aspects of the present disclosure.

DETAILED DESCRIPTION

In accordance with various aspects of the disclosure, methods, non-transitory computer-readable media, and apparatuses are disclosed for quoting house and home insurance and providing supplemental information about house and home insurance. In certain aspects, when a server receives data from a computing device, the server processes and analyzes the data.

Figure 1:
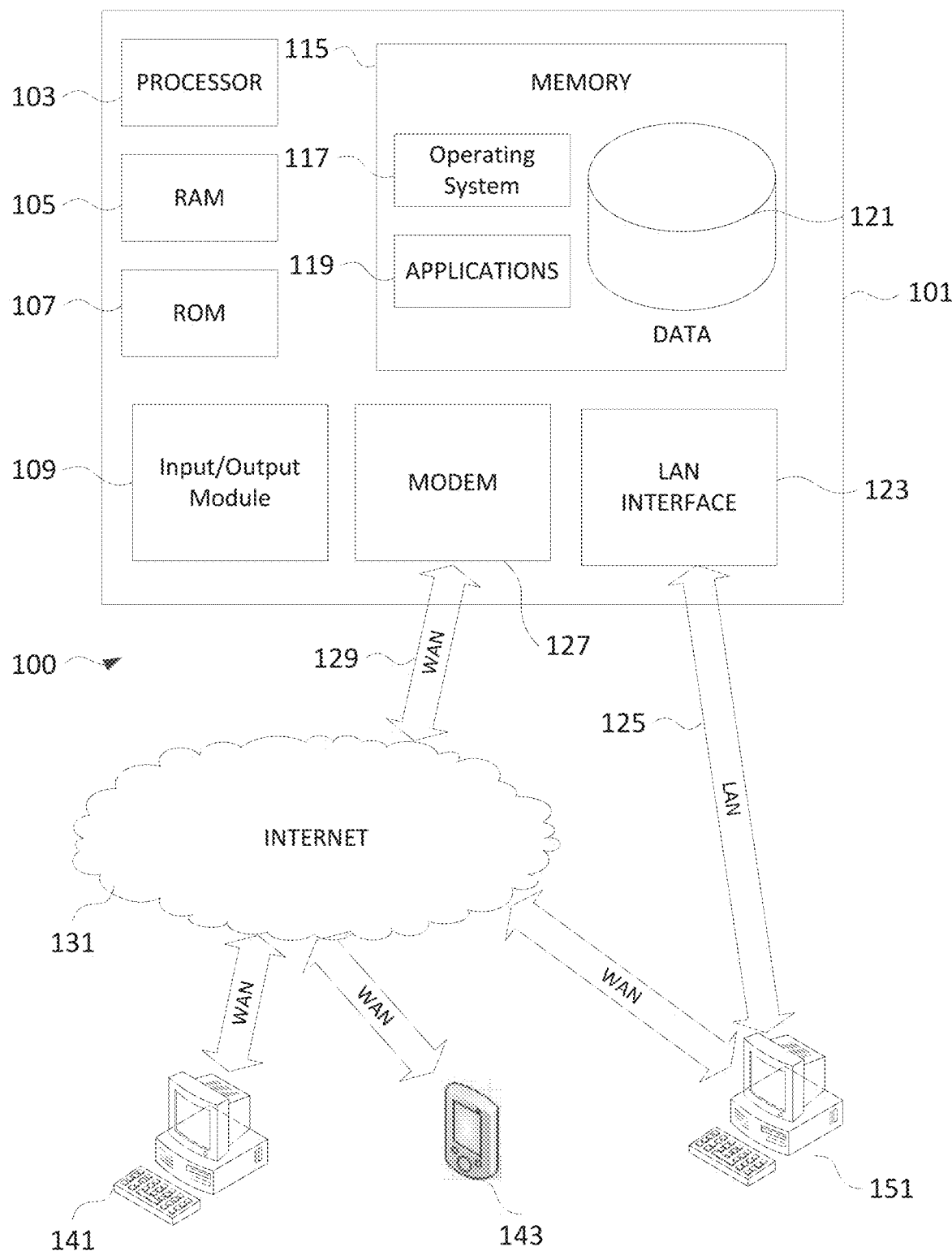
FIG. 1 shows an illustrative operating environment in which various aspects of the disclosure may be implemented.

FIG. 1 illustrates an example of a suitable computing system 100 that may be used according to one or more illustrative embodiments. The computing system 100 is only one example of a suitable computing environment and is not intended to suggest any limitation as to the scope of use or functionality contained in the disclosure. The computing system 100 should not be interpreted as having any dependency or requirement relating to any one or combination of components shown in the illustrative computing system 100.

The disclosure is operational with numerous other general purpose or special purpose computing systems or configurations. Examples of well-known computing systems, environments, and/or configurations that may be suitable for use with the disclosed embodiments include, but are not limited to, personal computers (PCs), server computers, hand-held or laptop devices, mobile devices, tablets, multiprocessor systems, microprocessor-based systems, set-top boxes, programmable consumer electronics, network PCs, minicomputers, mainframe computers, distributed computing environments that include any of the above systems or devices, and the like.

With reference to FIG. 1, the computing system 100 may include a computing device (e.g., server 101) wherein the processes discussed herein may be implemented. The server 101 may have a processor 103 for controlling the overall operation of the server 101 and its associated components, including random-access memory (RAM) 105, read-only memory (ROM) 107, input/output module 109, and memory 115. Processor 103 and its associated components may allow the server 101 to run a series of computer-readable instructions related to receiving, storing, and analyzing data to determine an event's risk level.

Server 101 may include a variety of computer-readable media. Computer-readable media may be any available media that may be accessed by server 101 and include both volatile and non-volatile media, removable and non-removable media. For example, computer-readable media may comprise a combination of computer storage media and communication media.

Computer storage media include volatile and non-volatile, removable and non-removable media implemented in any method or technology for storage of information such as computer-readable instructions, data structures, program modules, or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information that can be accessed by server 101.

Computing system 100 may also include optical scanners (not shown). Exemplary usages include scanning and converting paper documents, such as correspondence, data, and the like to digital files.

Although not shown, RAM 105 may include one or more applications representing the application data stored in RAM 105 while the server 101 is on and corresponding software applications (e.g., software tasks) are running on the server 101.

Input/output module 109 may include a microphone, keypad, touch screen, and/or stylus through which a user of server 101 may provide input, and may also include one or more of a speaker for providing audio output and a video display device for providing textual, audiovisual and/or graphical output.

Software may be stored within memory 115 and/or storage to provide instructions to processor 103 for enabling server 101 to perform various functions. For example, memory 115 may store software used by the server 101, such as an operating system 117, application programs 119, and an associated database 121. Also, some or all of the computer executable instructions for server 101 may be embodied in hardware or firmware.

Server 101 may operate in a networked environment supporting connections to one or more remote computing devices, such as computing devices 141, 143, and 151. The computing devices 141, 143, and 151 may be personal computing devices or servers that include many or all of the elements described above relative to the server 101. The computing devices 141, 143, 151 may be a mobile computing devices or servers that include many or all of the elements described above relative to server 101.

The network connections depicted in FIG. 1 include a local area network (LAN) 125 and a wide area network (WAN) 129, but may also include other networks. When used in a LAN networking environment, server 101 may be connected to the LAN 125 through a network interface (e.g., LAN interface 123) or adapter in the communications module 109. When used in a WAN networking environment, the server 101 may include a modem 127 or other means for establishing communications over the WAN 129, such as the Internet 131 or other type of computer network. It will be appreciated that the network connections shown are illustrative and other means of establishing a communications link between the computing devices may be used. Various well-known protocols such as TCP/IP, Ethernet, FTP, HTTP and the like may be used, and the system may be operated in a client-server configuration to permit a user to retrieve web pages from a web-based server. Any of various conventional web browsers may be used to display and manipulate on web pages.

Additionally, one or more application programs 119 used by the server 101, according to an illustrative embodiment, may include computer executable instructions for invoking functionality related to communication including, for example, email short message service (SMS), and voice input and speech recognition applications.

Embodiments of the disclosure may include forms of computer-readable media. Computer-readable media include any available media that can be accessed by a server 101. Computer-readable media may comprise storage media and communication media and in some examples may be non-transitory. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For instance, aspects of the method steps disclosed herein may be executed on a processor 103 on server 101. Such a processor may execute computer-executable instructions stored on a computer-readable medium.

Figure 2:
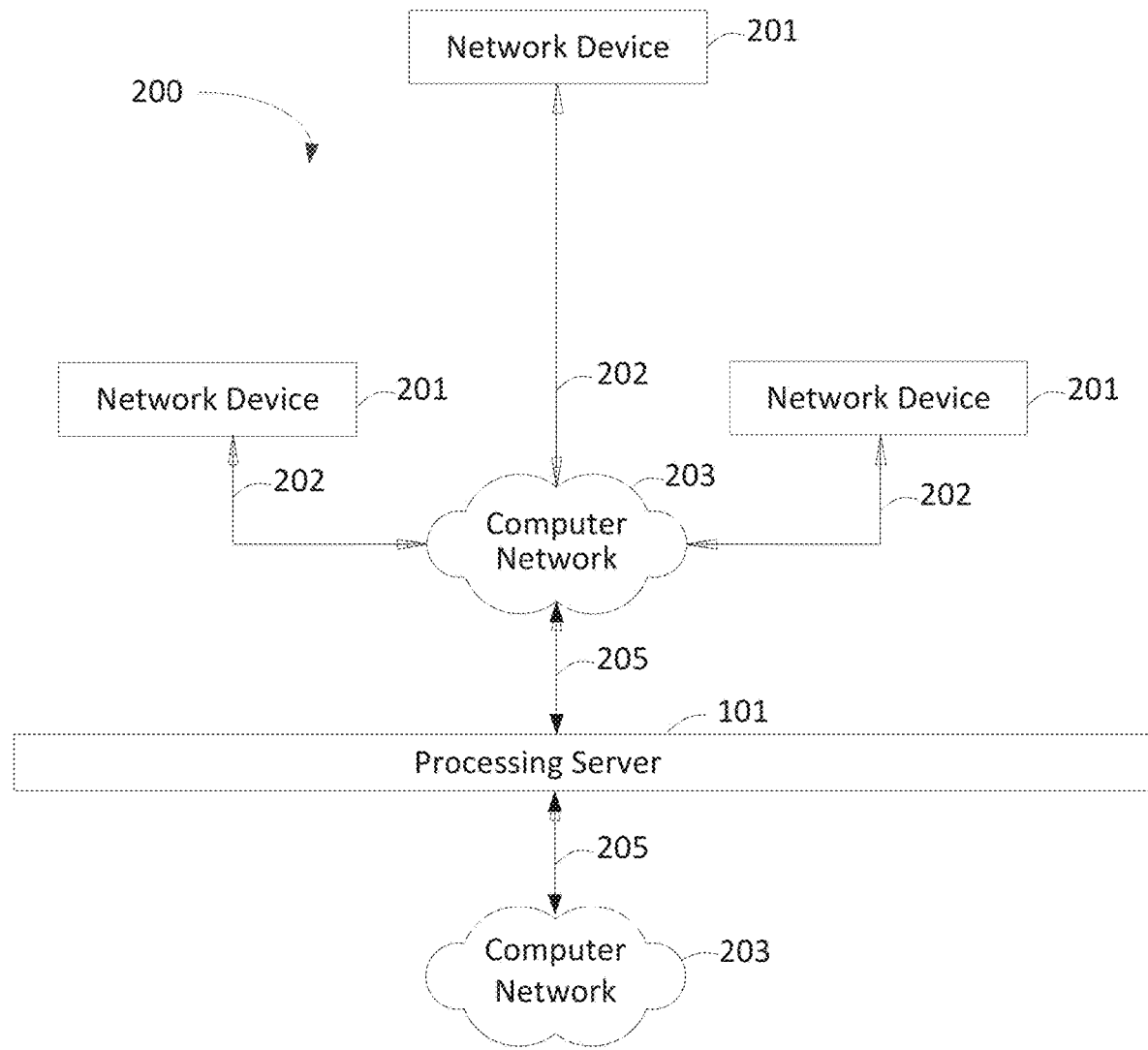
FIG. 2 shows an illustrative block diagram of workstations and servers that may be used to implement the processes and functions of one or more aspects of the present disclosure.

FIG. 2 illustrates another example operating environment in which various aspects of the disclosure may be implemented. As illustrated, system 200 may include one or more network devices 201. Devices 201 may be local or remote, and are connected by one or more communications links 202 to computer network 203 that is linked via communications links 205 to processing server 101. In certain embodiments, network devices 201 may represent mobile user devices configured to access data stored in server 101. In certain embodiments, network devices 101 may represent a user computing device configured to access data stored in server 101. In system 200, processing server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and server 101, such as network links, dial-up links, wireless links, hard-wired links, etc.

Although embodiments of the disclosure discussed herein relate to house or home insurance, one of ordinary skill in the art would recognize that other types of insured items, including auto, may be employed with a similar scheme.

Having described an example of a computing device that can be used in implementing various aspects of the disclosure and an operating environment in which various aspects of the disclosure can be implemented, several embodiments will now be discussed in greater detail.

Figure 3A:
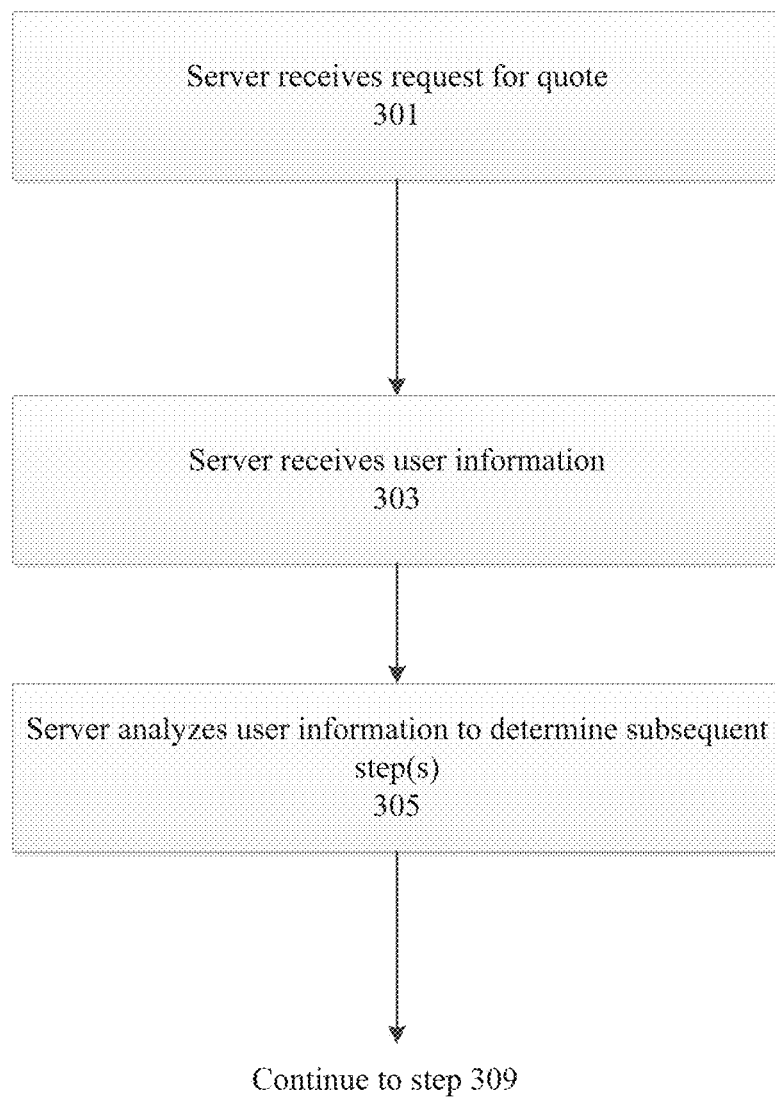
FIG. 3A shows a flow chart of an example process in accordance with aspects of the present disclosure.

An exemplary flow chart displaying an illustrative method of the disclosure is provided in FIG. 3A. As shown in FIG. 3A, the illustrative method may begin at step 301. At step 301, one or more servers (e.g., server 101) may receive a request for a quote for home insurance by a user via a mobile computing device or a computing device. In any instance, server 101 may provide information via a webpage to be provided, displayed, and viewed on a mobile computing device or a user computing device.

At step 303, one or more servers (e.g., server 101) may receive user information related to a user (e.g. consumer, customer, client, insured, potential insured, etc.) and the house or home the user is requesting to obtain a quote or information about. In some embodiments, the user information may be risk tolerance data (e.g., financial risk tolerance data) and/or stability information (e.g., financial stability data). For example, the risk tolerance data may be information that helps determine how much risk the user is willing to assume. In another example, the risk tolerance data may be information that determines how much financial risk the user is willing to take or may be able to handle. In some aspects, the risk tolerance data may be a risk profile. The risk profile may comprise financial information (e.g. cash flow, savings, investments, debts, etc.) and financial habits (e.g. spending, savings, bill pay, etc.) of the user. As another example, the risk tolerance data may be information about the risk tolerance of the user where the risk tolerance may relate to how big a financial gamble the user is willing to take or endure. Still, as another example, the risk tolerance data may be the level of risk the user is willing to assume based on a percentage or likelihood of a particular event occurring that may affect the amount of money the user may have to pay out. In yet another example, the financial risk tolerance data may be a measure of how risk adverse the user may be.

In some embodiments, the user information may include liquid asset data (e.g., cash liquidity data). For example, the cash liquidity data may be information about how much money the user has set aside in case of an emergency. In some aspects, the cash liquidity data may be information about how much cash the user has readily available. In some aspects, the cash liquidity data may be information about how much money the user has in their checking, savings, and/or other bank account. As another example, the cash liquidity data may indicate how much disposable income the user has. As another example, the cash liquidity data may indicate how many disposable assets the user has or how many assets the user has that can be turned into cash quickly. As another example, the cash liquidity data may indicate how much credit the user has available. As another example, the cash liquidity data may be the amount of available credit the user has at a given point in time (e.g. the difference in the user's credit limit less the amount of credit that has already been used).

In some embodiments, the user information may be zip code data about the user's house or home and where the home is located. For example, the zip code data may be the zip code in which the home is located. Another example, the zip code data may be a zip code of the home the user plans to buy. In some aspects, a home may be an apartment, a condo, a parcel of land, a farm, a duplex, or any other dwelling or premise (e.g., business). In some embodiments, the user information may include information regarding the user's current insurance policy or coverages. For example, the user information may indicate the current coverages the user has on their home. In some embodiments, the user information may be information about the home (e.g., house characteristics or house characteristic information) the user is seeking to cover. For example, the home information may be information about the size of the house, the year it was built, the number of bedrooms, the number of bathrooms, the acreage of land, the heating method, whether the house has air conditioning, the number of garages, the type of garage (detached or unattached), whether there is a pool, whether there is a basement, attic, or crawl space, if there was any damage to the house, if the house has been renovated or remodeled, if there was an addition to the house, or the type/style of the house (e.g. ranch, duplex, apartment, condo, etc.). In some embodiments, the user information may be any one of the aforementioned forms of information alone or any combination of the aforementioned forms of information.

In some aspects, the user information may be information about the home the user is seeking to cover, and server 101 may receive user information from a third party (e.g., from a computing device or server owned or operated by an entity different from the insurance provider). The third party information may include home information such as square footage, number of bedrooms, number of bathrooms, etc. In some embodiments, the third party information may include external risk information. For example, external risk information may be characteristic information such as the servicing fire department, whether the fire department is full-time, voluntary only, part-time, etc., the distance of the home from the fire department, distance of the home from the nearest fire hydrant, etc.

In some aspects, the user information (e.g., customer information) may be current coverage information. In some aspects, the current coverage information may be information related to insurance coverage currently on the user's home. In certain aspects, server 101 may receive and store the current coverage information of one or more consumers. The current coverage information may be provided by a third-party insurance provider separate from the insurance provider associated with server 101. Server 101 may receive the current coverage information from the third-party insurers. Server 101 may also receive the current coverage information directly from the consumer. In some aspects, the current coverage information may be received automatically at server 101. In some aspects, the current coverage information may refer to a consumer's current coverage with a third-party insurer or may refer to a prior coverage provided to the consumer (e.g., a coverage that was provided at some earlier time and is no longer in effect). Server 101 may store the current coverage information for one or more consumers (e.g., at database 121).

At step 305, one or more serves (e.g., server 101) may analyze the user information to determine one or more subsequent steps. For example, server 101 may analyze the user information and determine that more information is required and may prompt a user for the additional information. Another example, server 101 may analyze the user information and determine that more information is required and transmit a request to the user's mobile computing device or the user's computing device for the additional information. In some embodiments, server 101 may receive supplemental information based on transmitting a request for additional user information and then may analyze the supplemental information alone or in combination with the user information. For example, the server 101 may determine (while analyzing the user information) that it only received zip code data and risk tolerance data, and may query the user for liquid asset data.

Figure 3B:
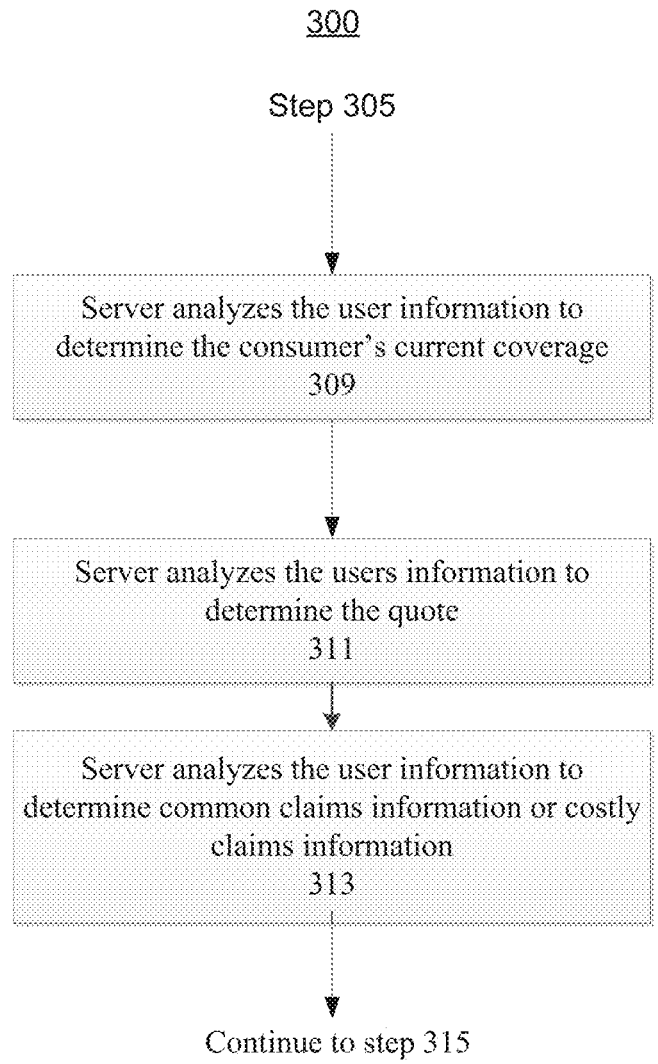
FIG. 3B shows a flow chart of an example process in accordance with aspects of the present disclosure.

As shown in FIG. 3B, the illustrative method may continue from step 305 to step 309. At step 309, one or more servers (e.g., server 101) may analyze the user information to determine the consumer's current coverage. For example, the server 101 may use user information such as zip code information and house information to determine the consumer's current coverage. As another example, the server 101 may analyze the user information to determine what the user submitted for the current coverage information.

In certain aspects, server 101 may analyze the consumer's stored insurance information to determine the consumer's current coverages. The current coverage information may include information such as insurance liability (e.g. money/items that is owed or would have to be provided to a customer to reimburse or cover the customer for fire damage, property damage, flood damage, etc.), deductibles, insurance limits, type of insurance and/or coverage (e.g., coverage for fire damage, property damage, flood damage, tornado damage, hurricane damage, water damage, theft, etc.), etc. In some aspects, server 101 may analyze and review the consumer's stored current coverage information and identify home insurance coverage provided by the insurance provider associated with server 101 that is similar to the current coverage provided by a third-party insurer. For instance, server 101 may detect that the consumer's current home insurance covers property damage up to a $100K limit and fire payments up to $10K. Server 101 may then analyze the home coverage options of its associated insurance provider and determine for the same coverages (e.g., property damage $100K and fire payments up to $10K) a cost or premium associated with those coverages. The associated insurance provider may refer to an insurance provider that manages server 101 (e.g., server 101 may be managed under the direction or control of the associated insurance provider). The associated insurance provider may also be referred to, herein, as the managing insurance provider.

Server 101 may store various coverage options offered by the managing insurance provider. For example, server 101 may store home insurance coverage options in one or more tables located in memory 115. After server 101 has analyzed the consumer's current coverage information, a coverage comparison module stored in memory 115 may compare the consumer's current coverage with coverage options offered by the managing insurance provider. For instance, after server 101 has determined that the consumer's current home insurance covers property damage up to $100K and fire payments up to $10K, coverage comparison module may determine a coverage offered by the managing insurance provider that is the same or similar to covering property damage up to $100K and fire payments up to $10K. Thereafter, server 101 may calculate a quote for the coverage similar to the consumer's current coverage at step 311.

At step 311, one or more serves (e.g. server 101) may analyze the user information to determine a quote. For example, the server 101 may use user information such as zip code information and information about a home to determine a quote. In some examples, the server 101 may analyze the user information to determine what the user submitted for current coverage information and compare that to other houses of a similar build located in a similar area using the user information to determine a quote. The quote may specify an insurance premium and deductible as well as the level of insurance coverage needed to partially or fully insure a particular home (e.g., the user's home). In some aspects, there may be a quote calculation module that may apply a formula stored at server 101 to calculate the quote based on the various aspects of the insurance coverage. For example, coverage of property damage up to $100K may cost $40 per month, and coverage of fire payments up to $10K may cost $30 per month. The costs associated with the aspects of the coverage may be stored at server 101. The quote calculation module may then apply a formula (e.g., that adds all the values together) to calculate a quote of $70 per month for coverage similar to the consumer's current coverage. The quote, therefore, provides an estimate for coverage based on the consumer's current coverage.

At step 313, one or more servers (e.g. server 101) may analyze the user information to determine claim information, common claims, common claims information, costly claims, or costly claims information. In some embodiments, the server 101 may use the user information (e.g., zip code data) and gather claim data about houses located in the same zip code as the home the user wishes to get coverage for. For example, the server 101 may gather data for all home insurance claims for every house located in a certain zip code or zip codes within a certain radius of a predetermined zip code. In some embodiments, the server 101 may use the user information and gather claim data about houses with a similar build, size, or likeness as the home the user wishes to get coverage for. For example, if the user has a five bedroom house with a two car garage the server 101 may gather data on houses with five bedrooms and two car garages. In some embodiments, the server 101 may use any combination of the aforementioned limitation for gathering claim data. For example, if the user has a four bedroom house with a one car garage located in the 15213 zip code, the server 101 may gather claim information for all houses that have four bedrooms and one garage in the 15213 zip code. In some aspects, the information gathered about the similar houses may be used to provide the user with a quote or with additional information about how the user compares to similar homeowners. For example, the quote may include additional information that indicates that the user has a higher income than other homeowners of other similar homes and therefore should consider paying a higher premium for additional coverage to protect from potential lawsuits.

In some embodiments, the claim information may indicate information about the type and/or amount of insurance coverage a user may have purchased from an insurance provider for a particular house for a particular peril. For example, the claim information may be a particular amount of insurance coverage purchased for covering a particular event, e.g., $200,000 in fire protection. In some embodiments, the claim information may be all the different insurance coverages an individual has on their house. In some embodiments, the claim information may be information about claims filed in a particular zip code. For example, the claim information may be information regarding how many fire damage claims were made in a certain zip code over a particular amount of time. In some embodiments, the claim information may be a gathering of all the claims and all the types of claims for a certain type of home or a home located in a certain area or a combination of both. For example, the claim information may list all the home insurance claims made for four bedroom houses in the 15213 zip code.

In some embodiments, the server 101 may analyze the claim information to determine what the most common claims are in a particular area. For example, the server 101 may determine from the claim information that in the 15213 zip code flood claims are the most common type of claim. In some embodiments, the server 101 may rank the most common claims for a type of house or zip code. For example, the server 101 may list or rank the most common claims for four bedroom houses in the 15213 zip code. An example of a listing of the most common claims may include fire claims, then flooding claims, and then theft claims.

In some embodiments, the server 101 may analyze the claim information to determine what the most costly claims are in a particular area. For example, the server may determine from the claim information that in the 15213 zip code flood claims are the most costly claim. In some embodiments, the server 101 may rank the most costly claims for a type of house or zip code. For example, the server 101 may list or rank the most costly claims paid out for four bedrooms houses in the 15213 zip code. An example of a listing of the most costly claims paid out may include fire claims, then flooding claims, and then theft claims. In some embodiments, the server 101 may determine the most costly claim is the claim that results in the highest amount of payouts during a predetermined period of time (e.g., within the last year). In some embodiments, the server 101 may determine the most costly claim is the claim that costs the most per occurrence (e.g., cost each time a claim is made or each time a claim is paid). For example, if claims related to fire damage amount to $100 k over the course of the previous 5 years while claims related to flood damage amount to $200 k over the course of the previous 5 years, then the server 101 may determine that the most costly claim is a claim related to flood damage. Or, in another example, if the average claim related to fire damage is $5 k while the average claim related to flood damage is $3 k, then the server 101 may determine that the most costly claim is a claim related to fire damage (even though there may have been more claims related to flood damage).

In some embodiments, the claim information may be common coverages, common coverage information, or common coverage levels information. In some aspects, the common coverage information may indicate coverage levels and/or deductible information for people or a person that may have similar house characteristics to a user's house (e.g., a user who may seek to purchase insurance coverage or who may inquire about purchasing insurance). For example, server 101 may generate common coverage information for houses similar to the user's house (e.g., 4 bedroom ranch house with a pool in the 22203 zip code) by collecting all the insurance coverage information for any 4 bedroom ranch house with a pool in the 22203 zip code.

In some aspects, after server 101 has analyzed the consumer's current coverage information, a coverage comparison module (or coverage comparison function) stored in memory 115 may compare the consumer's current coverage with coverage of other people that may have the same characteristics and in the same location as the consumer. For instance, after server 101 has determined that the consumer's current home insurance covers property damage up to $100K and fire payments up to $10K, the coverage comparison module may determine that the consumer is similar to other people with a similar house in the same area. For example, the average coverage purchased by the people in the area may include home insurance that covers property damage up to $200K and fire payments up to $15 k. In some aspects, server 101 may use the aforementioned zip code information and the user information to help determine the correct people to compare the consumer's coverage with. In some aspects, after server 101 has identified the correct people to compare the consumer's coverage with the server may determine what adjustments may need to be made to the consumer's current coverage in order for the consumer to have similar coverage and pricing to the correct people. In some aspects, server 101 may determine consumer information which may consist of insurance coverage information of people who have similar characteristics to the consumer seeking coverage.

In some aspects, after server 101 has analyzed the consumer's current coverage information, a coverage comparison module stored in memory 115 may compare the consumer's current coverage cost with cost of coverage of other people that may have similar characteristics and whose homes are in similar locations (e.g., in a same zip code, areas with similar population densities, areas with similar characteristics, such as waterfront property). For example, information that coverage of property damage up to $100K may cost a particular consumer $40 per month, and coverage of fire payments up to $10K may cost the particular consumer $30 per month may be compared with information regarding the average costs for similar types of insurance of people with similar characteristics located in a similar area (e.g., property damage up to $100K may cost $20 per month on average, and coverage of fire payments up to $10K may cost $20 per month on average). Thereafter, server 101 may determine whether the cost of insurance of the particular consumer is higher or lower than the cost of insurance coverage of other people with similar characteristics.

At step 315, one or more servers (e.g. server 101) may receive risk tolerance data. In some aspects, the risk tolerance data may be formulated when server 101 transmits to a mobile computing device or a user computing device a series of questions and receives from the mobile computing device or the user computing device a series of answers. For example, server 101 may transmit a question that will help evaluate the type of risk the user/customer is willing to take. For example, one question may be transmitted from server 101 to inquire or help classify/understand a user by asking a question about the user's tolerance for risk. In another example, an additional question may be transmitted from server 101 to inquire or help classify/understand a user by asking a question about the user's availability of cash information. In another example, the server 101 may ask one or both types of questions. The type of risk the user is willing to take may help to characterize if the user is risk adverse or risk seeking. In some aspects, the financial risk tolerance data may be determined in a similar manner in which the risk tolerance data is determined. In some aspects, the financial risk tolerance data may be data that helps categorize the type of risk or amount of risk a user is willing to assume. In some aspects, the financial risk tolerance data may relate to risk aversion information where risk aversion may be the reluctance of a person to accept a deal or bargain with an uncertain payoff rather than another deal or bargain with a more certain, but possibly lower, expected payoff. In some aspects, step 315 may help server 101 determine the user's deductible or deductible information. For example, if the user has a high risk tolerance or is risk seeking then server 101 may determine the user can handle a higher deductible and a lower monthly premium. In another example, if the server 101 determines the user has a low risk tolerance and/or is risk adverse then server 101 may generate a lower deductible and a higher monthly premium. If no risk tolerance data is received, the method may proceed to step 319. At step 319, if no financial risk tolerance data is received at server 101, then server 101 may determine a deductible or deductible information based on the user information.

If, at step 315, risk tolerance data is received, then the method may proceed to step 317. At step 317, server 101 may transmit a question which may help to evaluate the user's finances. For example, the question may ask how many liquid assets the user has readily available or for an estimate of a value of the user's liquid assets. As another example, the question may ask how much money the user has in a checking and/or savings account. As another example, the question may ask how much cash does the user have on hand or readily available (e.g., cash in pocket, cash in safe, cash in family member's account). In some aspects, the cash liquidity data may be an amount of money the user has set aside in case of emergency. In some aspects, the cash liquidity data may be an amount of credit the user has readily available or available at any given point in time. In some aspects, step 317 may help the server determine the appropriate deductible as stated above or in combination with the risk tolerance data. For example, if the user has a lot of money saved up or a lot of cash available, sever 101 may determine the user can handle (e.g., is suited for) a high deductible and lower premium. In another example, if the user has no cash and not a lot of credit available, server 101 may determine the user may be more suited a lower deductible and higher monthly premium. If, at step 317, no cash liquidity data is received, then the method may proceed to step 321. At step 321, if there is no cash liquidity data received, then server 101 may determine a deductible or deductible information may be determine based on the user information and the financial risk tolerance data, as discussed herein.

If, at step 317, cash liquidity data is received, then the method may proceed to step 323. At step 323, server 101 may determine deductible or deductible information based on user information, financial risk tolerance data, and/or cash liquidity information. In some examples, server 101 may generate a deductible or a deductible option from $5,000 to 2% of the property value (depending on the value of the house). In some aspects, the deductible information may show (or explain to) the customer what they have currently selected and what they might consider selecting based on what type of risk taker they are or their level of risk tolerance. For example, a customer may have a deductible of $5,000 but the server 101 may determine a suggested/customized deductible could be a deductible of $7,500 based on the customer's risk tolerance. In another example, a customer may be given a deductible of $5,000 and the server may determine based on their cash liquidity data they should have a deductible of $3,000. As another example, a customer may have a deductible of 2%, but based on their risk tolerance data and cash liquidity data, might prefer to have a deductible of 10%. The server 101 may be configured to determine and provide the more preferred (e.g. suitable) deductible to the customer for their consideration. In some examples, both the more preferred/suitable deductible and current deductible (or standard deductible) may be transmitted to the customer for his/her comparison and/or consideration.

In some aspects, the deductible information may be information to help the customer understand the deductible (e.g., when the user would be responsible/liable). In some aspects, the deducible information may be information explaining what a customer deductible is and why it is a certain amount or what deductible is recommended for the customer and why that amount is recommended. For example, the deductible information may explain that a customer might prefer to have a deductible of $5000 based on their cash liquidity data and their financial tolerance data.

In some aspects, the deductible information will provide information describing the reasoning for the recommended deductible. For example, the deductible information may explain that the recommended deductible is greater than the user's current deductible because the user has more cash than others with similar homes (or otherwise in a similar situation).

At step 325, the server 101 may output or transmit a quote, common claims information, costly claims information, and/or deductible information. For example, server 101 may output, to a mobile computing device, a quote for a home with information about the most costly claims for a house with similar characteristics located in a similar area and what the most common level of coverage is for a house with similar characteristics located in a similar area is. In some aspects, server 101 may output or transmit information to the customer that is helpful for understanding house insurance or their insurance quote. For example, server 101 may output deductible information containing a deductible amount e.g., $5000 and an explanation of why the deductible is $5000. The deductible information may also include other options the customer has and reasons to choose or decline those options.

Server 101 may output the quote via input/output module 109, modem 127, and/or LAN interface 123 so it may be displayed to the consumer's computing device (e.g., computing device 141). The output provided by server 101 may be in the form of one or more quote screens (e.g., webpages). The quote may provide a cost in dollars and may provide the cost over a period of time (e.g., $241 per month). In some aspects, the quote may be state-specific, such that the costs are adjusted according to the consumer's state of residence (e.g., taking into account taxes) or discounts available to the customer. Similarly, the quote may be based on other locations (e.g., zip code, city, etc.). The quote may also include other information, such as the cost of the down payment (e.g., $225), installments plus easy pay fee (e.g., $241*5), the total cost over an extended period of time (e.g., $1427 6-Month Total), the date the premiums are calculated, etc. The quote may also detail coverage highlights. For example the quote may provide a detailed list of each type of coverage and the amount of the coverage and the cost (e.g., premium) for that amount of coverage. Further, the coverage highlights may include the start date, liability, limits, collision & comprehensive, deductibles, etc. The limits and deductibles may be detailed in dollar amounts.

In certain aspects, the quote may include applied discounts that may be determined via an applied discounts module stored at memory 115. The applied discounts may include discounts that have been applied to the consumer's quote. The applied discounts may also include further discounts the consumer may be eligible to receive. The values of the discounts may be determined by server 101 as dollar amounts (e.g., total saved: $225 and $130 could be saved). In some aspects, the applied discounts module may also determine methods for the consumer to receive further discounts (e.g., EZPay=$55 Discount; Pay in Full=$45 Discount; Future Effective Date=$30 Discount). "EZPay" may refer to a payment option for automatic bank withdrawal. "Pay in Full" may refer to paying an entire premium up front. "Future Effective Date" may refer to an early signing discount in which the consumer purchases insurance from the managing insurance provider a certain amount of days prior to the consumer's current policy's expiration.

In some aspects, after step 325 the customer may be able to speak or contact an insurance agent. In some aspects, the customer may be able to connect via a website. In some aspects, an insurance agent may contact the customer. In some embodiments, agents may be identified and accessible at each and every step of the method.

Server 101 may also include an agent information module stored at memory 115. In some aspects, the agent information module may be used to provide agent information for a managing insurance provider as part of the quote. In some aspects, memory 115 may store agent information (e.g., agent names, addresses, specialties, etc.). Agent information module may review the information stored in memory 115 to identify at least one agent that may be able to serve the consumer. Agent information module may identify an agent according to a set of rules stored in server 101. For instance, agent information module may select an agent closest in geographic proximity to the consumer and provide that agent's information in the quote. Agent information module may also select an agent using other methods (e.g., state-related rules, status of the agent, etc.). In some aspects, the consumer may be able to contact the agent (e.g., via telephone, email, etc.) by selecting a link (on a webpage). Upon receiving a request to speak with an agent, agent information module may notify the agent (e.g., via telephone, email, etc.) so that the agent may communicate with the consumer. Similarly, a consumer may click on a link (on the webpage) to contact an agent or other employee of the managing insurance provider. In certain aspects, a consumer may be able to schedule a call with an agent by selecting a link (on a webpage).

Although certain steps have been described as being performed in a particular order and in response to other steps, the steps may be performed in a different order. For example, steps 315 and 317 may be switched with one another such that step 321 is performed in response to determining that financial risk tolerance data is not received in which case step 321 may include analyzing user cash liquidity data to determine deductible information. Further, other steps described herein may be modified. Also, additional steps may be added and some steps may be omitted in various methods.

Figure 4:
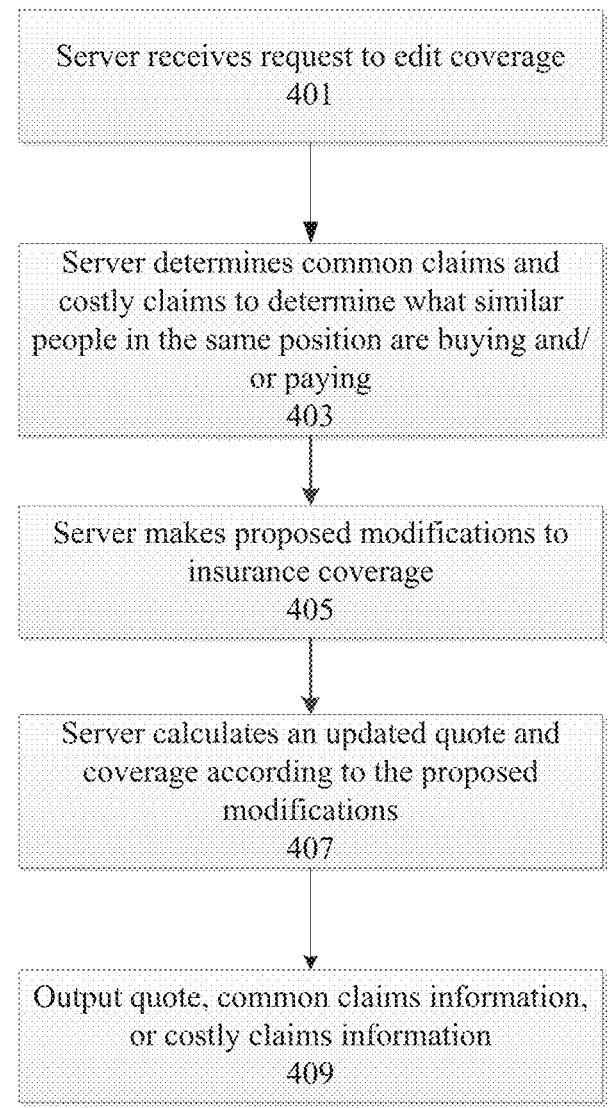
FIG. 4 shows a flow chart of an example process in accordance with various aspects of the present disclosure.

An exemplary flow chart displaying an illustrative method of the disclosure is provided in FIG. 4. As shown in FIG. 4, the illustrative method may begin at step 401. At step 401, one or more servers (e.g., server 101) may receive a request to edit coverage (e.g., home insurance coverage) via a mobile computing device or a computing device. In step 401, the server may also receive user information as described herein. Once the server 101 has received the request the server may determine claim information, common claim information, and/or costly claim information at step 403, as described herein. For example, step 403 may include evaluating which insurance products are purchased by similar people (e.g., similarly situated insurance policy holders). At step 405, using the common claim information, the user information, and/or the costly claim information the server 101 may determine modifications to a customer's insurance coverage. At step 407, server 101 may calculate a new quote based on the coverage changes determined at step 405. At step 409, server 101 may output an updated quote, common claims information, costly claim information, and/ or updated deductible information.

In some aspects, after receiving a request to edit coverage, server 101 may output options to modify the quoted insurance coverage. For example, a coverage details module may output data regarding policy coverage information, claim limits, deductibles, premiums, etc. In some aspects, coverage details may be customizable by the consumer. For instance, fire coverage may initially have associated claim limits of $100K per accident. The consumer may select to alter the amount of fire coverage to $150K per accident. After the consumer selects preferred values for the insurance coverage, the server 101 may calculate an updated quote and coverage according to the proposed modifications. Next, server 101 may output an updated quote to the customer's computing device or a mobile computing device, wherein the quote and coverage information are updated according to the modifications received at the server.

In certain aspects, server 101 (e.g., via a coverage guide module stored at memory 115) may respond to the request by outputting options to modify insurance coverage. Further, server 101 may output one or more questions to the consumer in regards to the request to modify insurance coverage. The questions may be directed at the consumer (e.g., marital status, employment status, number of vehicles, household income and equity, etc.). The consumer may provide answers to the questions. Server 101 may receive the consumer's answer. In certain aspects, a coverage guide module may use the answers received to calculate an updated quote and coverage. For example, server 101 may receive answers that indicate that the consumer has a very low household income. Using this information, the coverage guide module may output one of the cheapest quotes for coverage offered by the managing insurance provider or adjust a combination of the coverage limits and the deductible to be able to provide a lower rate for insurance coverage. In some aspects, coverage guide module may compare the answers to stored information at memory 115 of coverage information purchased by customers with similar demographic information. For instance, coverage guide module may output a quote for coverage that has been purchased by others with similar answers as those provided by the consumer.

Figure 3C:
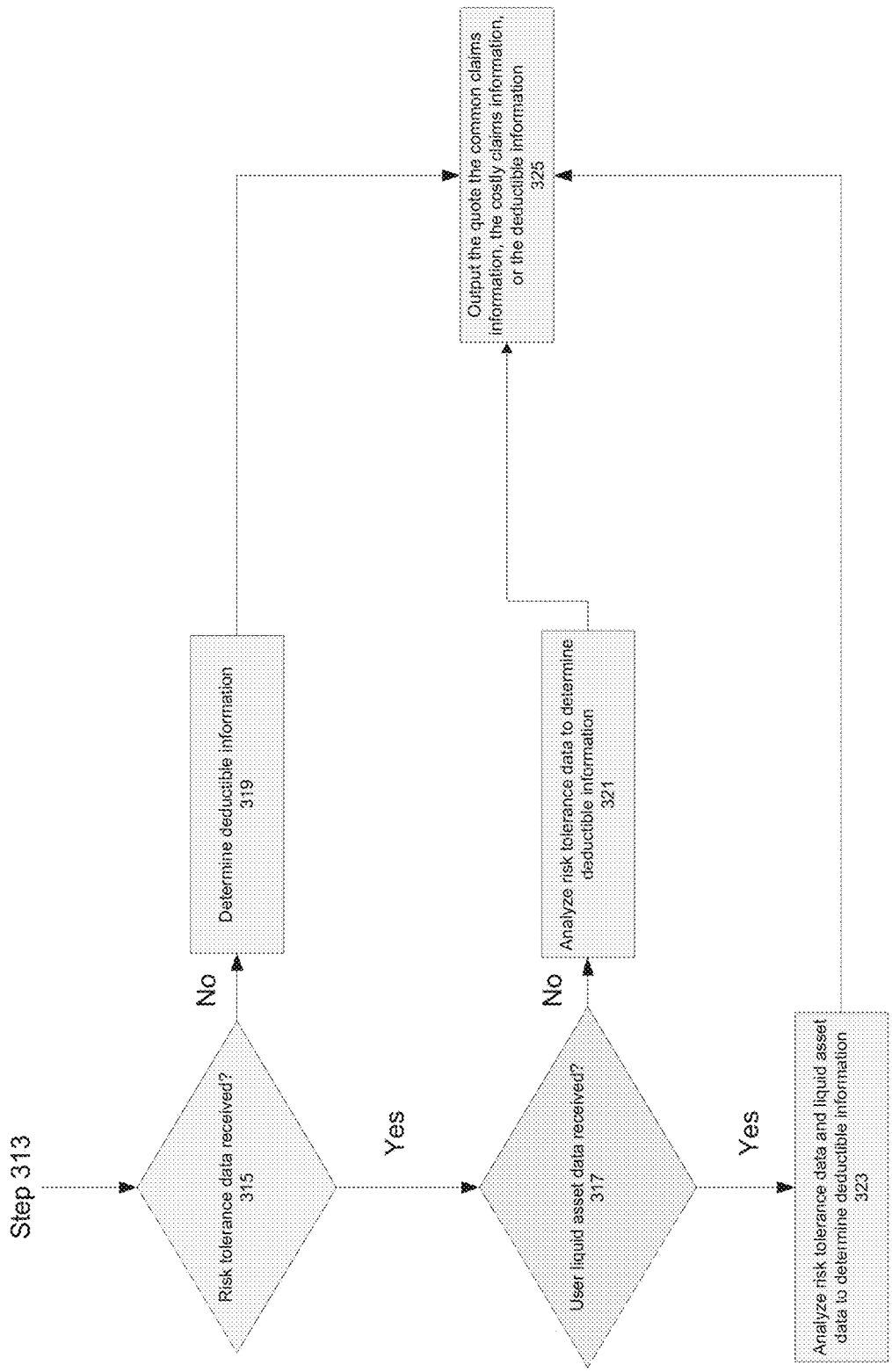
FIG. 3C shows a flow chart of an example process in accordance with aspects of the present disclosure.

As with the methods of FIGS. 3A-3C, steps may be added, omitted, or modified to the method of FIG. 4. For example, step 409 may be split up so that common claims information is output separately (e.g., before or after) from costly claims information.

Figure 5:
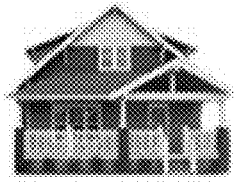
FIG. 5 shows an illustrative interface in accordance with various aspects of the present disclosure.

FIG. 5 shows an illustrative interface (e.g., user interface) or screen with coverage tools in accordance with various aspects of the present disclosure. In some aspects, FIG. 5 may be an interface 500 displayed on a display of a device. For example, a user device (e.g. mobile phone, laptop, tablet, etc.) may access the internet and display an interface 500 via a web browser. As such, the interface 500 may be in the form of one or more webpages. In some aspects, the interface 500 may be provide from a head end or a server and may be transmitted to another device. For example, an insurance company may generate an interface 500 at its head end or server and may transmit the interface 500 to user devices, such as the ones described herein. In some aspects, the interface 500 may be interactive and may allow the user to navigate through various interfaces (e.g. different webpages) and may allow a user to input information into the interface 500 via a user device.

In some aspects, interface 500 may display coverage tools 510. Coverage tools 510 may help to educate and empower the user. In some aspects, the coverage tools 510 may be customized to the user, and may make the coverages easier to understand. Thus, the coverage tools may give the user confidence in selecting the right insurance coverage. In some aspects, the coverage tools may comprise, but are not limited to, a "coverage in action" tool 515, a "common coverage levels" tool 520, and a "find deductibles that fit" tool 525. In some aspects, coverage in action tool 515 may show how selected coverages and limits stack up against the most common and costly perils. In some aspects, common coverage levels 520 may let the user(s) see what levels of insurance were purchased by others (e.g., other customers of an insurance provider) with similar homes. In some aspects, the find deductibles that fit tool 520 may allow the user(s) to choose the right deductible(s) based on their own risk tolerance. In some aspects, the interface 500 may display a button or links that may allow the user to connect to and utilize each individual tool. For example, coverage in action tool 515 may have its own link or button to connect the user to the application or interface for that individual tool as well as the common coverage levels tool 520 and the find deductibles that fit tool 525.

In some aspects, the interface 500 may display a review of an estimated quote or display information related to an estimated quote. For example, the interface 500 may display the cost per month of the premium. As another example, the interface 500 may display the down payment, installments (of payments), the total cost of payments, any discounts, and the amount of those discounts. As another example, the interface 500 may display coverage details such as the different types of coverage the user may have and the amount (limits) and deductible for those coverages (e.g. dwelling protection with a limit of $510,267, other structures with a limit of $51,027 (10% of dwelling), personal property protection with a limit of $306,160, additional living expenses with a limit of $51,027, family liability protection with a limit of $100,000, guest medical protection $1,000, etc.). In another example, the interface 500 may display deductible details and how they may apply to particular coverages (e.g., all peril deductible $2,000 per occurrence, windstorm/hail deductible $2,000). In some aspects, the interface 500 may include interactive buttons or links that may allow the user to view and edit coverage details. In another example, the interface 500 may include a button(s) or link(s) that may allow the user to purchase the insurance coverage with an agent. In some aspects, the interface 500 may display information about additional coverages. For example, the additional coverages information may indicate that extended coverage on jewelry is available or already applied, that watches and furs may be covered for up to $5,000 or are already covered up to $5,000, that a roof surfaces extended coverage endorsement is available, and that items damaged due to a water back up may be covered up to $5,000 or are already covered up to that amount under the current policy. In some aspects, the interface 500 may display tabs or links to other webpages that may contain insurance or insurance quote information for standard, choice, and premium coverages. In some embodiments, the interface 500 may include a comparison of different coverages. For example, interface 500 may display tabs or links that illustrate that standard coverage may be $153/month, choice coverage may be $181/month, and premium coverage may be $231/month, and may have a link to compare the coverages.

Figure 6:
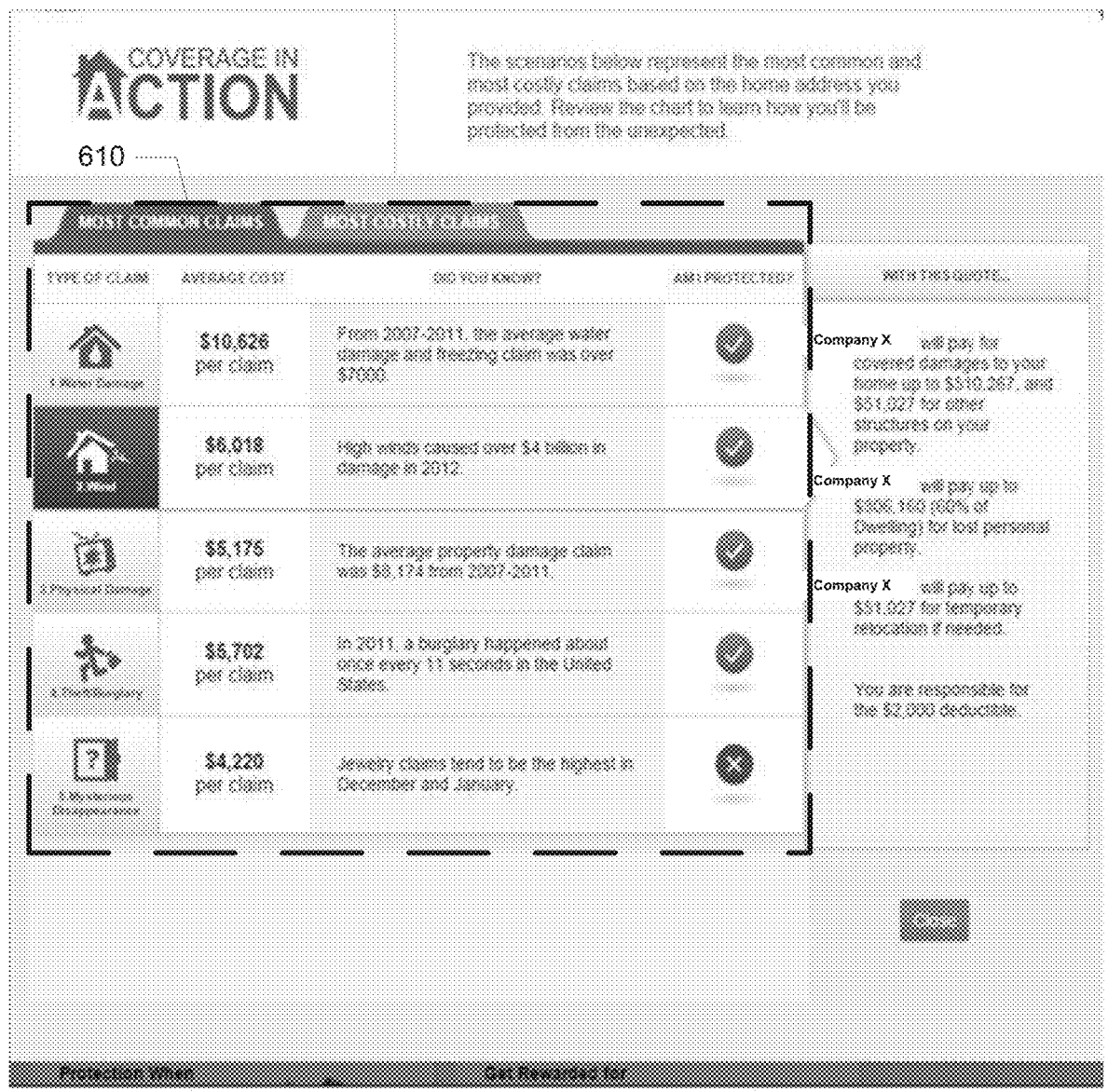
FIG. 6 shows an illustrative interface in accordance with various aspects of the present disclosure.

FIG. 6 shows an illustrative interface or screen of the "coverage in action" tool 515 in accordance with various aspects of the present disclosure. In some aspects, the interface 600 is similar and may contain features similar to those described above in regards to interface 500. In some aspects, the coverage in action tool 515 may illustrate scenarios that may represent the most common and most costly claims based on the home address the user displays. In some aspects, the interface 600 may display a chart that allows the user to learn how they may be protected from the unexpected.

In some aspects, the interface 600 may display a table 610 of the most common claims. For example, the most common claims table 610 may display types of claims (e.g., water damage, wind, physical damage, theft/burglary, mysterious disappearance, etc.) and an average cost for a respective type of claim (e.g., $10,626 per claim, $6,018 per claim, $5,702 per claim, $4,220 per claim). In some aspects, the interface 600 may include information related to the type of claim that gives some additional information or context to the type of claim. For example, the table may include a "did you know?" fact. Examples of facts may include: for a water claim—from 2007-2011, the average water damage and freezing claim was over $7,000; for a wind claim—high winds caused over $4 billion in damage in 2012; for a physical damage claim—the average property damage claim was $8,174 from 2007-2011; for a theft/burglary claim—in 2011, a burglary happened about once every 11 seconds in the United States; and for a mysterious disappearance claim—jewelry claims tend to be the highest in December and January.

In some aspects, the common claims table 610 may display an "Am I protected?" section. For example, the "Am I protected?" section may be a column of the table, where for each type of claim it shows the user a check or an x to designate/indicate whether they do or do not have coverage for that type of claim. In some aspects, the interface 600 may also display information about what the insurance company may pay or cover in regards to the type of claim and the type of quote the user is quoted. For example, the interface 600 may have a section called "with this quote . . . " and list information such as, company x may pay for covered damages to your home up to $510,267, and $51,027 for other structures on your property; company x may pay up to $360,160 (60% of dwelling) for lost personal property; company x may pay up to $51,027 for temporary relocation if needed; and the user may be responsible for a $2,000 deductible. Such information may help a customer (or potential customer) understand the various benefits of insurance coverage and "soft spots" (e.g., vulnerabilities) in some insurance coverages.

In some aspects, the most common claims information may be based on a location of the insured property (e.g., based on a zip code of the insured property). In some aspects, the interface 600 may list the five most common claims and/or the five most costly claims which may alert the user of local perils and the average cost of each of those perils. In some aspects, the interface 600 makes it quick and easy to see if the user may be protected from a particular peril. In some aspects, the interface 600 may also display the dynamic content of the limits and deductibles selected by the user for the different types of coverages in regards to the user house (which may be displayed in interface 500, e.g., the coverage highlights section) to explain the amount of coverage available to the user in the event of a particular claim.

In some embodiments, a table describing the most costly claims may be generated. In some aspects, the information for the most costly claims may be the same as the most common claims, but presented in a different order. For example, a most costly claims table (not shown) may display the top 5 most costly claims and may alert the user of local perils and the average cost of those perils.

Figure 7:
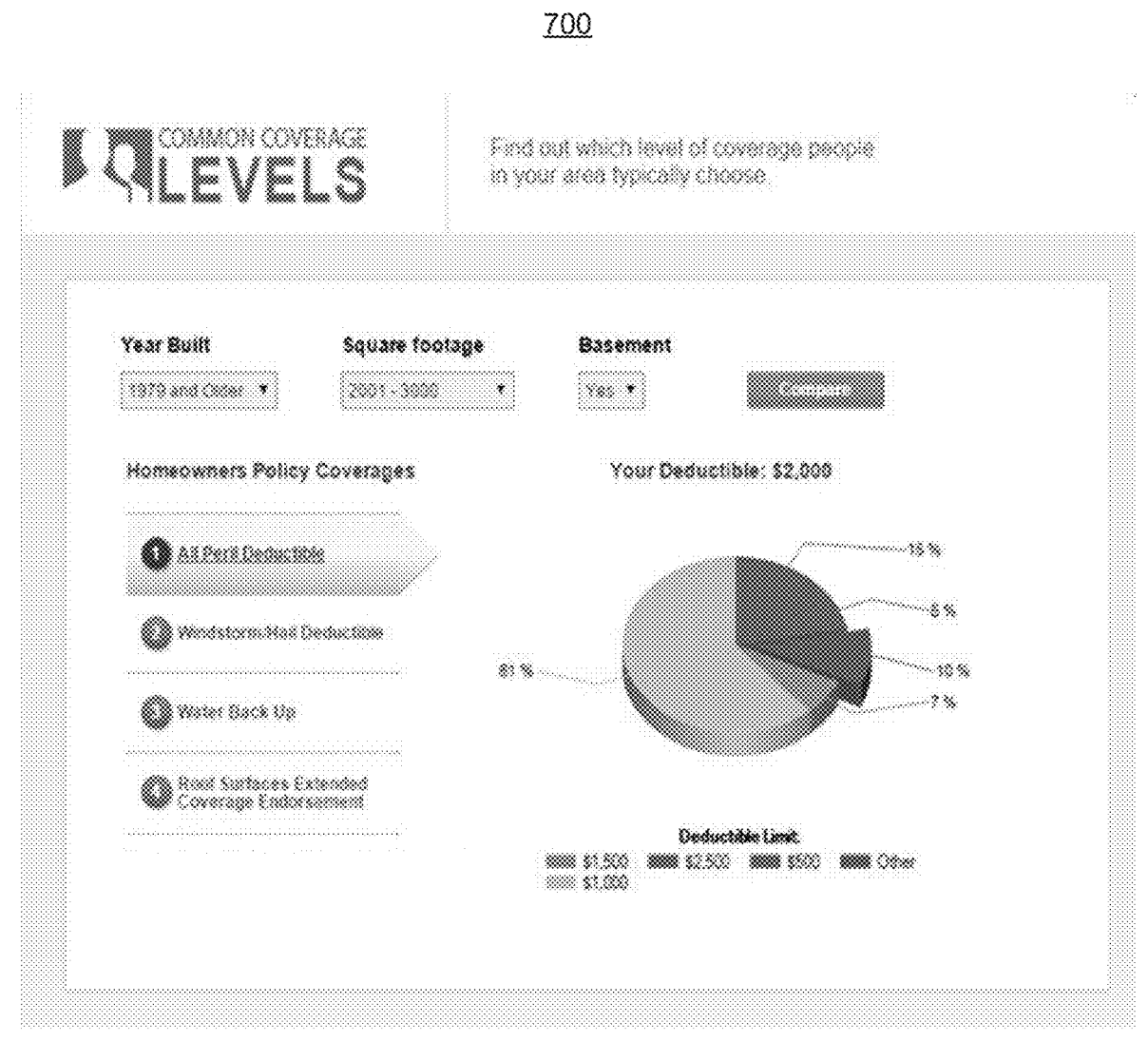

FIG. 7 shows an illustrative interface or screen of a common coverage levels tool in accordance with various aspects of the present disclosure. FIG. 7 may illustrate interface 700 for the common coverage levels tool 520 as described above. In some aspects, the common coverage levels tool 520 may find out which level of coverage people, in a customer's (or potential customer's) area, typically choose. In some aspects, interface 700 may display information about a particular property or property that a customer is looking to insure. For example, interface 700 may display information about an insured property. In some aspects, interface 700 may include information about the property, such as the year built, the square footage, whether there is a basement, homeowners policy coverages, a deductible, or deductible limits. In some aspects, interface 700 may use graphs or figures to display information.

In some embodiments, the common coverage levels information may be based on a location of the insured property (e.g., based on a zip code). In some aspects, the user may see how their coverage and/or deductible amounts compare to other local users or insured persons. In some aspects, in order to keep the comparison similar, home data may be filtered by year built, square footage, whether there is a basement, etc. In some aspects, there may be initial default filter criteria based on the user's response(s) within an application interview. In some aspects, an application interview may include a number or series of questions that allow for collection of relevant information about the user in regards to the insurance coverage they seek. In some aspects, the user's selected coverage limit or deductible from a previous interface may be displayed. For example, a pie chart or graph may be displayed which may allow a user to quickly see how common their currently selected values are.

Figure 8A:
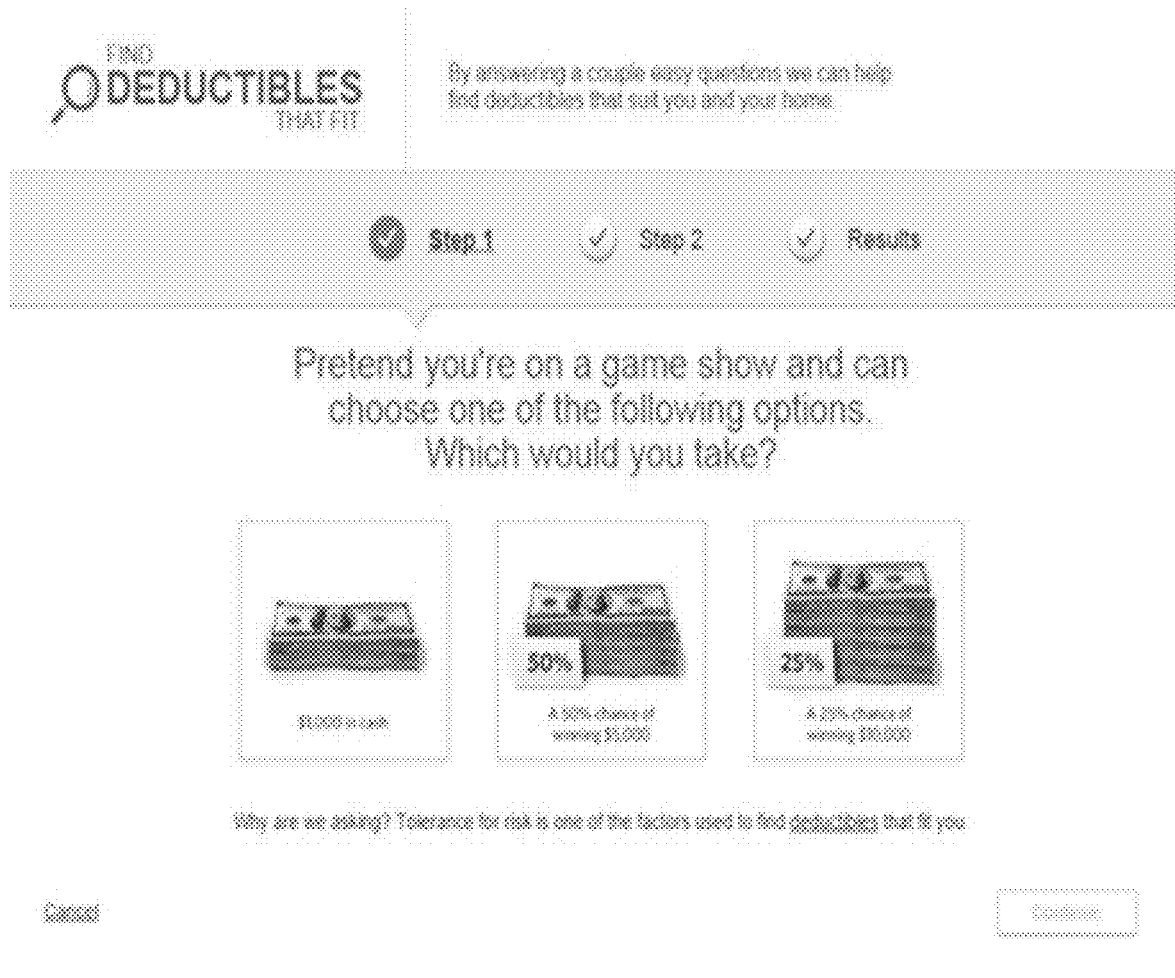
FIG. 8A shows an illustrative interface in accordance with various aspects of the present disclosure.

FIG. 8A shows an illustrative interface or screen of the "find deductibles that fit" tool in accordance with various aspects of the present disclosure. FIG. 8A may illustrate a first step of a method executed by the "find deductibles that fit" tool 525 as described above. In some aspects, the "find deductibles that fit" tool 525 may require the user to answer one or more questions that may help find a deductible that suits the user and the user's home. In some aspects, there may be a first step that may ask the user a question to help identify a more suitable deductible. For example, interface 800 may display a question, such as "pretend you're on a game show and can choose one of the following options— which one would you take?" In addition to the question, the interface 800 may also display various options, such as $1,000 in cash, 50% chance of winning $5,000, or 25% chance of winning $10,000, that allow the tool/system to gauge a user's tolerance for risk. The interface 800 may be interactive as described above so that the user may be able to select an answer or input an answer using a terminal or device. In some aspects, a question may be asked to help determine the tolerance for risk which may be used to find a deductible that fits the user.

Additionally, or alternatively, the "find deductibles that fit" tool 525 may determine a user's tolerance for risk based on driving behavior data, such as data indicating how fast a user drives, how fast a user takes sharp turns, whether a user drives late at night, or whether a user drives in bad/poor weather or road conditions. An organization (e.g., an insurance company) may collect driving behavior data from mobile computing devices (e.g., cell phones) of drivers or from devices installed in vehicles. In particular, such driving data may be obtained from GPS receivers and accelerometers of such devices. Driving behavior data may also be obtained from other third party servers. For example, weather information may be obtained from a third part database. In any event, driving behavior data may be leveraged to determine a person's risk tolerance. For example, if driving behavior data indicates that a user drives faster than most drivers, the "find deductibles that fit" tool 525 may determine that the driver has a higher tolerance for risk than most people, and therefore, may suggest a home insurance policy with a higher than average deductible. In contrast, if driving behavior data indicates that a user drives slower than most drivers, the "find deductibles that fit" tool 525 may determine that the driver has a lower tolerance for risk than most people, and therefore, may suggest a home insurance policy with a lower than average deductible.

Figure 8B:
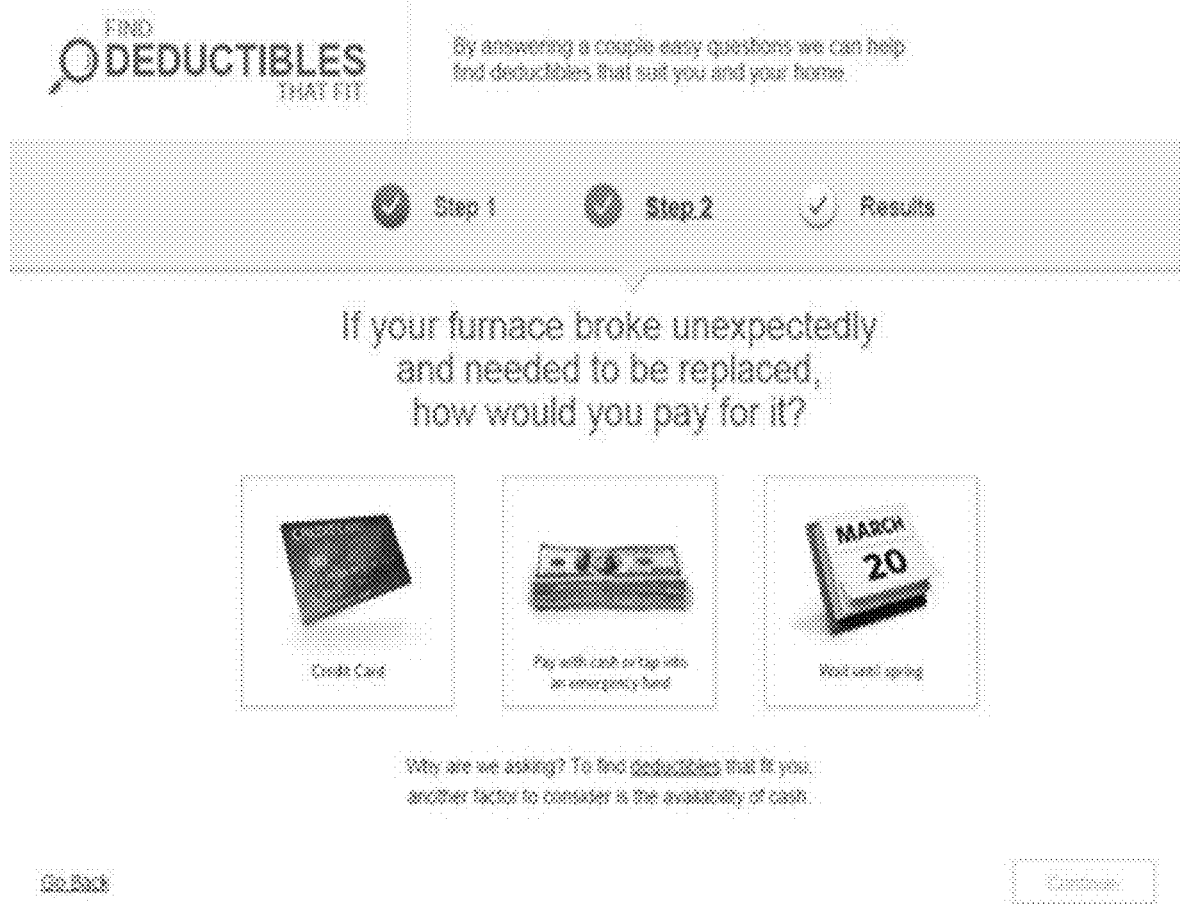
FIG. 8B shows an illustrative interface in accordance with various aspects of the present disclosure.

FIG. 8B shows an illustrative interface or screen of the "find deductibles that fit" tool 525 in accordance with various aspects of the present disclosure. In some embodiments, interface 810 may present the user with one or more of a series of questions. For example, FIG. 8b may illustrate an additional step where the user is asked another question. For example, interface 810 may display a question to the user such as, "if your furnace broke unexpectedly and needed to be replaced, how would you pay for it?", and may display the user with the following choices: "credit card," "cash or tap into an emergency fund," and "wait until spring." In some aspects, additional questions may be asked to determine what deducible fits the user. For example, the tool 525 may analyze another factor, such as the user's availability of cash. In some aspects, a two part analysis may be used to determine what a user may do in different hypothetical situations. For example, the server may generate one or more questions for each part to present to the user. In some aspects, this two part analysis may be implemented to determine a user's risk profile or the amount of risk a consumer is willing to take.

Figure 8C:
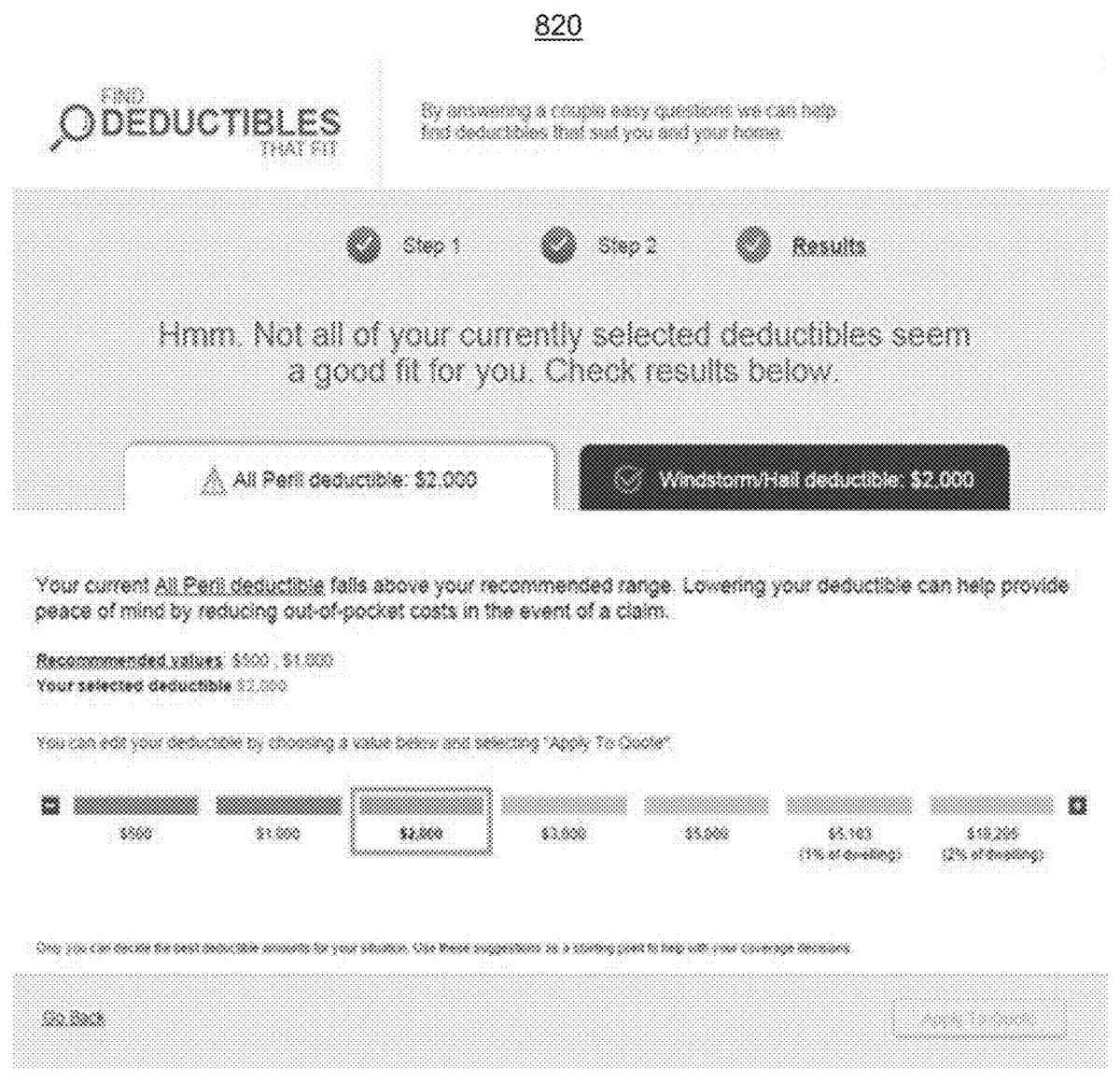

FIG. 8C shows an illustrative interface or screen of the "find deductibles that fit" tool 525 in accordance with various aspects of the present disclosure. In some aspects, interface 820 may display the results of the analysis used to determine the user's risk profile. For example, FIG. 8C may display the results of the determining the user's risk analysis. In another example, the interface 820 may display a recommended value and the user's selected deductible. In another example, the interface 820 may display a deductible and suggestions based on whether an all peril deductible is selected or an individual deductible (e.g. windstorm/jail deductible) is selected. In another example, the interface 820 may display a recommended range of deductibles and additional information about the recommended range. In another embodiment, the tool, system, and/or server may evaluate the common claims information to assess the probability or likelihood of the selection playing out in the claim scenario. As a result, the interface 820 may display to a user that if the user would lower their deductible to $1000, their chances of recovering their extra costs over the next 10 years may be 75%. In some aspects, the "find deductibles that fit" tool may gather all deductible options available, and assesses suitability of current selections from among a range of choices. In some aspects, the "find deductibles that fit" tool may alert a user using (e.g. color coded (red, green, yellow, etc.) flags or other indicators) as to whether her current selections seem to be a good fit for her. In some aspects, the user may be told her one, multiple, or no deductibles match her tolerance for risk. In some aspects, if the user's deductible does not 'fit' the user, the user may be able to make changes using the tool and may have her quote updated to reflect the new deductible amount.

Figure 9:
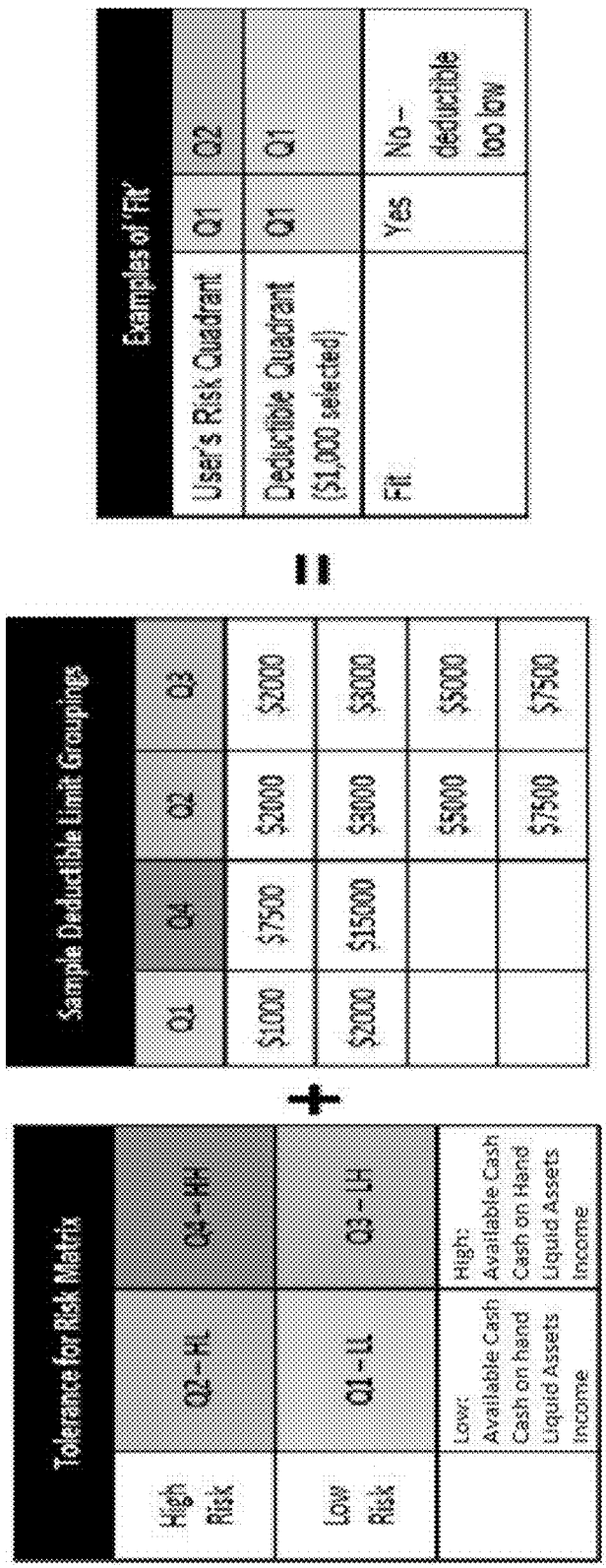
FIG. 9 shows logic used in accordance with various aspects of the present disclosure.

FIG. 9 shows logic used in accordance with various aspects of the present disclosure. The logic may be implemented with one or more algorithms. In some aspects, the "find deductibles that fit" tool may determine a suitable deductible by mapping the user's responses to various questions to a matrix that considers liquid assets (e.g., cash reserves, available cash, cash-on-hand, etc.) and/or income as well as "risk tolerance." In some aspects, a chosen deductible's "fit" may be determined by checking whether the chosen deductible matches a deductible in a grouping of deductibles associated with the user's risk quadrant. FIG. 9 illustrates how risk tolerance may be used to determine whether a user's selected deductible is a "fit" for the user. As shown in FIG. 9, in some examples, a tolerance for risk matrix may include four quadrants defined by four parameters (high risk, low risk, low income, and high income). FIG. 9 also illustrates sample deducible limit groupings that associate quadrants of the tolerance for risk matrix with various deductibles. FIG. 9 further illustrates an example of when a user's chosen deductible is determined to "fit" and an example of when a user's chosen deductible is determined "not to fit." In some examples, the logic may be used to identify which quadrant of a matrix a user may identify with. This may be done by mapping back to the questions and/or responses previously described, e.g., someone willing to take the 20% chance at $10000 may be mapped to a higher-risk quadrant than the individual opting for the $1000. In some embodiments, different characteristics previously described may determine how the user may be mapped to a particular quadrant of a matrix.

It should be noted that one or more aspects of the above-described embodiments may be applied to various types of items that may be insured, such as vehicles, homes, other properties, etc.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, where the described implementation includes software, it should be understood that a combination of hardware and software or hardware alone may be used in various other embodiments. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

The invention claimed is:

1. A method comprising:
   at a server comprising at least one processor, a communication interface, and memory storing computer executable instructions that, when executed, cause the server to:
      generate, one or more interactive user interfaces;
      receive, from a first device, a request for a quote for home insurance by a user;
      receive user information, wherein the user information comprises risk tolerance data for the user and zip code data for a home for which the home insurance is to cover;
      responsive to receiving the user information, transmit, via an established network connection, the one or more interactive user interfaces;
      request liquid asset data, via the one or more interactive user interfaces, determining, by the server and based on the zip code data, claim information for an area associated with the zip code;
      map the risk tolerance of the user and the liquid asset data to a deductible matrix in order to determine a customized deductible for the home insurance;
      determine a premium;

generate the quote based on the customized deductible and the premium;

output, via the network connection, the quote including deductible information providing an explanation for the deductible for display via the one or more interactive user interfaces, the one or more interactive user interfaces including a plurality of buttons representing links to execute one or more interactive tools for use by the user;

receive selection of a button representing a link to a first interactive tool; and responsive to receiving selection of the button, executing the first interactive tool and causing display of a second interactive user interface including functionality of the first interactive tool.

2. The method of claim 1, wherein the first interactive tool is associated with one or more questions, and wherein the received user information includes one or more answers to the questions.

3. The method of claim 1, further comprising storing the received user information in memory, and analyzing the stored user information in accordance with a second interactive tool.

4. The method of claim 1, further comprising classifying the user based on a comparison of the user information to a set of demographic data of similarly situated current users.

5. The method of claim 1, further comprising generating one or more recommendations for the user, each recommendation including an explanation of one or more factors associated with a plurality of damage events.

6. The method of claim 1, further comprising storing information in memory regarding a plurality of potential damage events and selecting a set of damage events predicted for the user based on a commonality of each of the damage events.

7. The method of claim 6, wherein the commonality of each of the damage events is based on the claim information for the area associated with the zip code.

8. The method of claim 6, further comprising receiving a selection regarding one of the damage events in the interactive user interface, and further dynamically updating the interactive user interface to display one or more different scenarios associated with the selected damage event.

9. The method of claim 8, wherein the further updated interactive user interface further includes one or more probabilities associated with different product options being used in the different scenarios.

10. An insurance rate server apparatus comprising:
an insurance rate processor; and
memory storing historical insurance information and a rate model, and further storing computer readable instructions that, when executed, cause the insurance rate server apparatus to perform:
generating, one or more interactive user interfaces;
receiving, from a first device, a request for a quote for home insurance by a user;
receiving user information, wherein the user information comprises risk tolerance data for the user and zip code data for a home for which the home insurance is to cover;
responsive to receiving the user information, transmitting, via an established network connection, the one or more interactive user interfaces;
requesting liquid asset data, via the one or more interactive user interfaces;

determining, by the server and based on the zip code data, claim information for an area associated with the zip code;

mapping the risk tolerance of the user and the liquid asset data to a deductible matrix in order to determine a customized deductible for the home insurance;

determining a premium;

generating the quote based on the customized deductible and the premium;

outputting, via the network connection, the quote along with at least one of: common claim information indicating at least one of the common claims, costly claim information indicating at least one of the costly claims, or deductible information providing an explanation for the deductible for display via the one or more interactive user interfaces, the one or more interactive user interfaces including a plurality of buttons representing links to execute one or more interactive tools for use by the user;

receiving selection of a button representing a link to a first interactive tool; and responsive to receiving selection of the button, executing the first interactive tool and causing display of a second interactive user interface including functionality of the first interactive tool.

11. The insurance rate server apparatus of claim 10, wherein the first interactive tool is associated with one or more questions, and wherein the received user information includes one or more answers to the questions.

12. The insurance rate server apparatus of claim 10, further comprising storing the received user information in memory, and analyzing the stored user information in accordance with a second interactive tool.

13. The insurance rate server apparatus of claim 10, further comprising classifying the user based on a comparison of the user information to a set of demographic data of similarly situated current users.

14. The insurance rate server apparatus of claim 10, further comprising generating one or more recommendations for the user, each recommendation including an explanation of one or more factors associated with a plurality of damage events.

15. The insurance rate server apparatus of claim 10, further comprising storing information in memory regarding a plurality of potential damage events and selecting a set of damage events predicted for the user based on a commonality of each of the damage events.

16. The insurance rate server apparatus of claim 15, wherein the commonality of each of the damage events is based on the claim information for the area associated with the zip code.

17. The insurance rate server apparatus of claim 15, further comprising receiving a selection regarding one of the damage events in the interactive user interface, and further dynamically updating the interactive user interface to display one or more different scenarios associated with the selected damage event.

18. The insurance rate server apparatus of claim 17, wherein the interactive user interface further includes one or more probabilities associated with different product options being used in the different scenarios.

19. One or more tangible computer readable media storing computer readable instructions that, when executed, cause a computer system to perform:
generating, one or more interactive user interfaces;

receiving, from a first device, a request for a quote for home insurance by a user;

receiving user information, wherein the user information comprises risk tolerance data for the user and zip code data for a home for which the home insurance is to cover;

responsive to receiving the user information, transmitting, via an established network connection, the one or more interactive user interfaces;

requesting liquid asset data, via the one or more interactive user interfaces;

determining, based on the zip code data, claim information for an area associated with the zip code;

mapping the risk tolerance of the user and the liquid asset data to a deductible matrix in order to determine a customized deductible for the home insurance;

determining a premium;

generating the quote based on the customized deductible and the premium;

outputting, via the network connection, the quote along with at least one of: common claim information indicating at least one of the common claims, costly claim information indicating at least one of the costly claims, or deductible information providing an explanation for the deductible for display via the one or more interactive user interfaces, the one or more interactive user interfaces including a plurality of buttons representing links to execute one or more interactive tools for use by the user;

receiving selection of a button representing a link to a first interactive tool; and responsive to receiving selection of the button, executing the first interactive tool and causing display of a second interactive user interface including functionality of the first interactive tool.

20. The one or more tangible computer readable media storing computer readable instructions of claim 19, wherein the first interactive tool is associated with one or more questions, and wherein the received user information includes one or more answers to the questions.

* * * * *